United States Patent
Chuma

(10) Patent No.: US 7,903,263 B2
(45) Date of Patent: Mar. 8, 2011

(54) POSITION DETECTION SENSOR

(75) Inventor: Toshiharu Chuma, Saitama (JP)

(73) Assignee: Fujinon Corporation, Saitama (JP)

( * ) Notice: Subject to any disclaimer, the term of this patent is extended or adjusted under 35 U.S.C. 154(b) by 47 days.

(21) Appl. No.: 12/466,634

(22) Filed: May 15, 2009

(65) Prior Publication Data

US 2009/0284760 A1 Nov. 19, 2009

(30) Foreign Application Priority Data

May 16, 2008 (JP) ................. P2008-129751

(51) Int. Cl.
*G01B 11/14* (2006.01)
(52) U.S. Cl. ........................ 356/616; 356/614
(58) Field of Classification Search .................. 356/614, 356/616, 617; 250/559.32
See application file for complete search history.

(56) References Cited

U.S. PATENT DOCUMENTS

| 5,260,568 A | * | 11/1993 | Ieki | ............ 250/231.18 |
| 2006/0267822 A1 | * | 11/2006 | Ito | ................. 341/143 |

FOREIGN PATENT DOCUMENTS

| JP | 2002-48599 A | 2/2002 |
| JP | 2005-24276 A | 1/2005 |

* cited by examiner

*Primary Examiner* — Roy Punnoose
(74) *Attorney, Agent, or Firm* — Birch, Stewart, Kolasch & Birch, LLP

(57) ABSTRACT

A position detection sensor is provided and includes: a scale including a self-emitting part that emits light to form a pattern on the scale; and a relative movable part provided in such a manner to be opposed to the scale and to be movable relative to the scale, the relative movable part including a light receiving part that detects the light emitted at a position in a portion of the scale where the pattern is formed, the position corresponding to a current position of an object to be measured. At least one of a traveling amount, traveling speed and absolute position of the object is detected based on a detection signal outputted from the light receiving part.

12 Claims, 12 Drawing Sheets

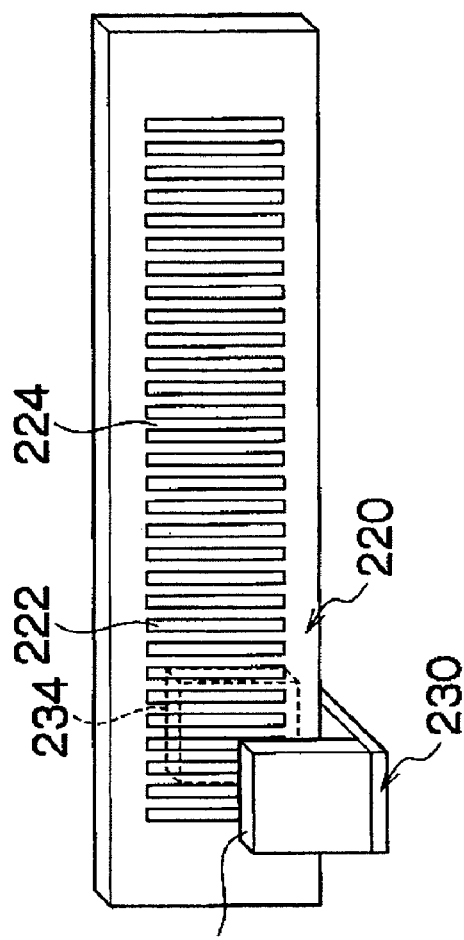
FIG. 14A *Prior Art*
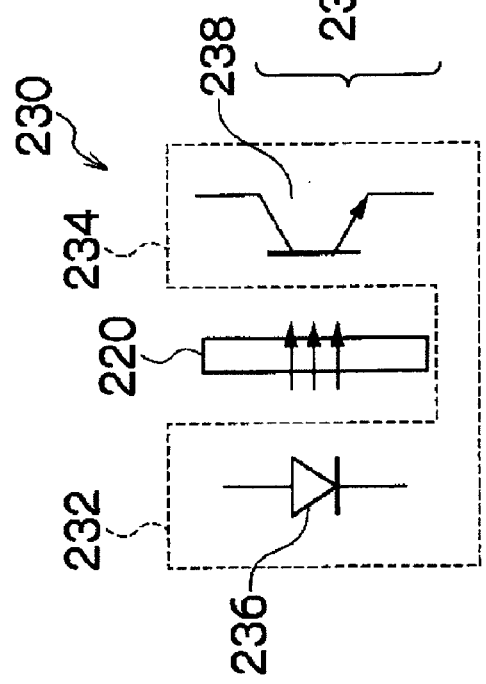
FIG. 14B *Prior Art*
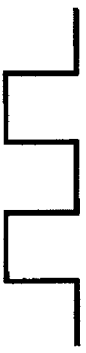
FIG. 14C *Prior Art*

POSITION DETECTION SENSOR

This application is based on and claims priority under 35 U.S.C. §119 from Japanese Patent Application No. 2008-129751, filed on May 16, 2008, the entire disclosure of which is herein incorporated by reference.

BACKGROUND OF THE INVENTION

1. Field of the Invention

The present invention relates to a position detection sensor and more particularly to a position detection sensor having a linear scale for detecting a traveling amount, traveling speed and absolute position of an object to be measured.

2. Description of Related Art

A photoelectric position detection sensor which employs a linear scale is, as is known, configured such that a relative traveling amount between an optical device and the linear scale and the position of the optical device relative to the linear scale can be detected by reading optically a pattern provided on the linear scale by the optical device which moves relative to the linear scale.

FIGS. 13A to 13C and 14B to 14C are drawings illustrating the configurations of conventional position detection sensors which employ a linear scale, of which FIG. 13A illustrates a reflective type position detection sensor and FIG. 14A illustrates a transmissive type position detection sensor.

In the reflective type position detection sensor, as is shown in FIG. 13A, high reflectivity portions (white or the like high luminance portions) 202 and low reflectivity portions (black or the like low luminance portions) 204 are provided alternately on a linear scale 200. In addition, a reflective photointerrupter 210 is disposed in such a manner as to be opposed to the reflective linear scale 200, and the photointerrupter 210 moves relative to the linear scale 200. For example, the linear scale 200 is attached to a stationary part, while the photointerrupter 210 is provided so as to move in conjunction with a moving object to be measured.

As is shown in FIG. 13B, a light projecting part (a light emitting device 212) for projecting light to the linear scale 200 and a light receiving part (a light receiving device 214) for receiving light projected from the light projecting part and reflected on the linear scale 200 are provided on the same surface side of the reflective photointerrupter 210. A pulse signal made up of a high level voltage and a low level voltage as is shown in FIG. 13C is outputted from the photointerrupter 210 (the light receiving device 214) as a detection signal every time the photointerrupter 210 travels a distance equaling one pitch which is made up of a high reflectivity portion 202 and a low reflectivity portion 204 lying adjacent thereto on the linear scale 200.

In the transmissive type position detection sensor, as is shown in FIG. 14A, slits (light transmissive portions) 222 and light blocking portions 224 are provided alternately on a linear scale 220. In addition, a transmissive photointerrupter 230 is disposed relative to the transmissive linear scale 220 in such a manner as to sandwich the linear scale 220 between its light emitting part 232 and light receiving part 234, and the photointerrupter 230 travels relative to the linear scale 220. For example, the linear scale 220 is attached to a stationary part, while the photointerrupter 230 is provided so as to move in conjunction with a moving object to be measured.

As is shown in FIG. 14B, the light projecting part 232 (a light emitting device 236) for projecting light to the linear scale 220 and the light receiving part 234 (a light receiving device 238) for receiving light which was projected from the light projecting part 232 and which passed through the linear scale 220 are provided on the transmissive photointerrupter 230 in such a manner as to be opposed each other across the linear scale 220. A pulse signal made up of a high level voltage and a low level voltage as is shown in FIG. 14C is outputted from the photointerrupter 230 (the light receiving device 234) as a detection signal every time the photointerrupter 230 travels a distance equaling one pitch which is made up of a slit 222 and a light blocking portion 224 on the linear scale 220.

JP-A-2002-048599 and JP-A-2005-024276 propose a technique in which a liquid crystal panel (a liquid crystal scale) is used as the linear scales described above, so that the patterns of the linear scales are realized by the liquid crystal panel through control of the liquid crystal.

In the reflective type position detection sensor described above, however, since reflected light which was originally projected from the light projecting part of the optical device and was then reflected on the linear scale is detected, the output level of a detection signal is generally low, and S/N ratios differ from product to product. Because of this, no stable detection signal can be obtained, and also it is difficult to set a slice level based on which it is determined whether a detection signal is a high or low level signal.

In addition, in the transmissive type position detection sensor described above, although the output level of a detection signal is high because light that has passed through a slit in the linear scale is detected, the shape of the slits affects detection accuracy. In addition, since the light emitting part and the light receiving part of the optical device (the photo-interrupter or the like) are disposed in such a manner as to be opposed to each other across the linear scale, the width of the sensor becomes large.

Further, the linear scales shown in FIGS. 13A and 14A are not intended for detecting absolute positions but intended for detecting relative positions (traveling amounts) and traveling speeds, and hence, they cannot detect absolute positions directly from detection signals. In addition, although there is a case where a linear scale employing a resistance value approach is used as a device for detecting an absolute position, an error is caused depending upon a traveling direction of a brush part for detecting a resistance value, leading to a problem related to accuracy.

SUMMARY OF THE INVENTION

The invention has been made in view of these situations, and an object of an illustrative, non-limiting embodiment of the invention is to provide a position detection sensor which can obtain a stable and high-output detection signal, enable the facilitation of detection of any desired value in traveling amount, traveling speed and absolute position, and be used in a narrow space.

According to a first aspect of the invention, there is provided a position detection sensor including:

a scale including a self-emitting part that emits light to form a pattern on the scale; and a relative movable part provided in such a manner to be opposed to the scale and to be movable relative to the scale, the relative movable part including a light receiving part that detects the light emitted at a position in a portion of the scale where the pattern is formed, the position corresponding to a current position of an object to be measured, wherein at least one of a traveling amount, traveling speed and absolute position of the object is detected based on a detection signal outputted from the light receiving part.

According to the first aspect of the invention, since self-emitted light is detected, it is possible to obtain a stable and high-output detection signal.

According to a second aspect of the invention, there is provided a position detection sensor as set forth in the first aspect of the invention, wherein a self-emitting paper display is provided in the portion of the scale where the pattern is formed, and the pattern is formed by an image display on the self-emitting paper display.

According to the second aspect of the invention, a resolution can be obtained which matches the number of lines which indicates the resolution of the paper display such as an organic electroluminescence display. In addition, the display can be used on a curved surface as in the case with a conventional printed reflective scale.

According to a third aspect of the invention, there is provided a position detection sensor as set forth in the first or second aspect of the invention, wherein a vertical light guiding plate is provided over a surface of the portion of the scale where the pattern is formed.

According to the third aspect of the invention, the dispersion of light is suppressed, and further, a stable and high-output detection signal can be obtained.

According to a fourth aspect of the invention, there is provided a position detection sensor as set forth in the first, second or third aspect of the invention, wherein the patter of the scale is a pattern in which high luminance portions and low luminance portions are arranged alternately, the light receiving part receives the light to detect a luminance of the received light, and the at least one of a traveling amount, traveling speed and absolute position of the object is detected based on the luminance of the received light.

The fourth aspect of the invention is such as to illustrate an embodiment of a scale pattern.

According to a fifth aspect of the invention, there is provided a position detection sensor as set forth in the fourth aspect of the invention, wherein the high luminance portions have respective luminances that differ according to positions of the high luminance portions, and the absolute position of the object is detected based on a magnitude of the luminance detected by the light receiving part.

According to the fifth aspect of the invention, it becomes possible to detect an absolute position based on the magnitude of the luminance detected by the light receiving part.

According to a sixth aspect of the invention, there is provided a position detection sensor as set forth in the fourth aspect of the invention, wherein the high luminance portions flash at frequencies that differ according to positions of the high luminance portions, and the absolute position of the object is detected based on a signal frequency of the luminance detected by the light receiving part.

The sixth aspect of the invention is such as to illustrate another embodiment of a scale pattern.

According to a seventh aspect of the invention, there is provided a position detection sensor as set forth in the first, second or third aspect of the invention, wherein the pattern of the scale is a pattern in which high color temperature portions and low color temperature portions are arranged alternately, the light receiving part receive the light to detect a color temperature of the received light, and the at least one of a traveling amount, traveling speed and absolute position of the object is detected based on the color temperature of the received light.

The seventh aspect of the invention is such as to illustrate a further embodiment of a scale pattern, in which the traveling amount, traveling speed or absolute value is made to be detected also by color temperature.

According to an eighth aspect of the invention, there is provided a position detection sensor as set forth in the four or seventh aspect of the invention, wherein in the pattern of the scale, a width ratio of the high luminance portions to the low luminance portions or a width ratio of the high color temperature portions to the low color temperature portions is made to be able to be changed.

According to the eighth aspect of the invention, it becomes possible to increase the resolution and save electrical power.

According to a ninth aspect of the invention, there is provided a position detection sensor as set forth in any of the first to eighth aspects of the invention, further including a memory for storing the pattern of the scale.

According to the ninth aspect of the invention, the scale pattern can be set arbitrarily by data stored in the memory.

According to a tenth aspect of the invention, there is provided a position detection sensor as set forth in the ninth aspect of the invention, wherein a pattern stored in the memory is made to be writable.

The scale pattern can be modified and adjusted arbitrarily by rewriting data in the memory.

According to an eleventh aspect of the invention, there is provided a position detection sensor including:

a scale including self-emitting portions and light receiving portions arranged alternately to form a pattern on the scale; and a relative movable part provided in such a manner to be opposed to the scale and to be movable relative to the scale, the relative movable part including a reflecting surface that reflects light emitted from a light emitting portion of the light emitting portions which corresponds to a current position of an object to be measured, so that the reflected light is incident on a light receiving portion adjacent to the light emitting portion, wherein at least one of a traveling amount, traveling speed and absolute position of the object is detected based on a detection signal outputted from the light receiving portion.

According to the eleventh aspect of the invention, since self-emitted light which is emitted from the scale is detected on the scale itself, it becomes possible to attain a stable light emission and light emission control.

BRIEF DESCRIPTION OF THE DRAWINGS

The features of the invention will appear more fully upon consideration of the exemplary embodiment of the invention, which are schematically set forth in the drawings, in which:

FIGS. 14A to 14C show diagrams depicting a configuration of a transmissive type position detection sensor which employs a linear scale.

DETAILED DESCRIPTION OF THE EXEMPLARY EMBODIMENTS

According to an aspect of the invention, the position detection sensor can be provided which can obtain a stable and high-output detection signal, enable the facilitation of detection of any desired value in traveling amount, traveling speed and absolute position, and be used in a narrow space.

Hereinafter, position detection sensors according to exemplary embodiments of the invention will be described in detail by reference to the accompanying drawings.

A position detection sensor according to a first embodiment of the invention will be described.

Figure 1:
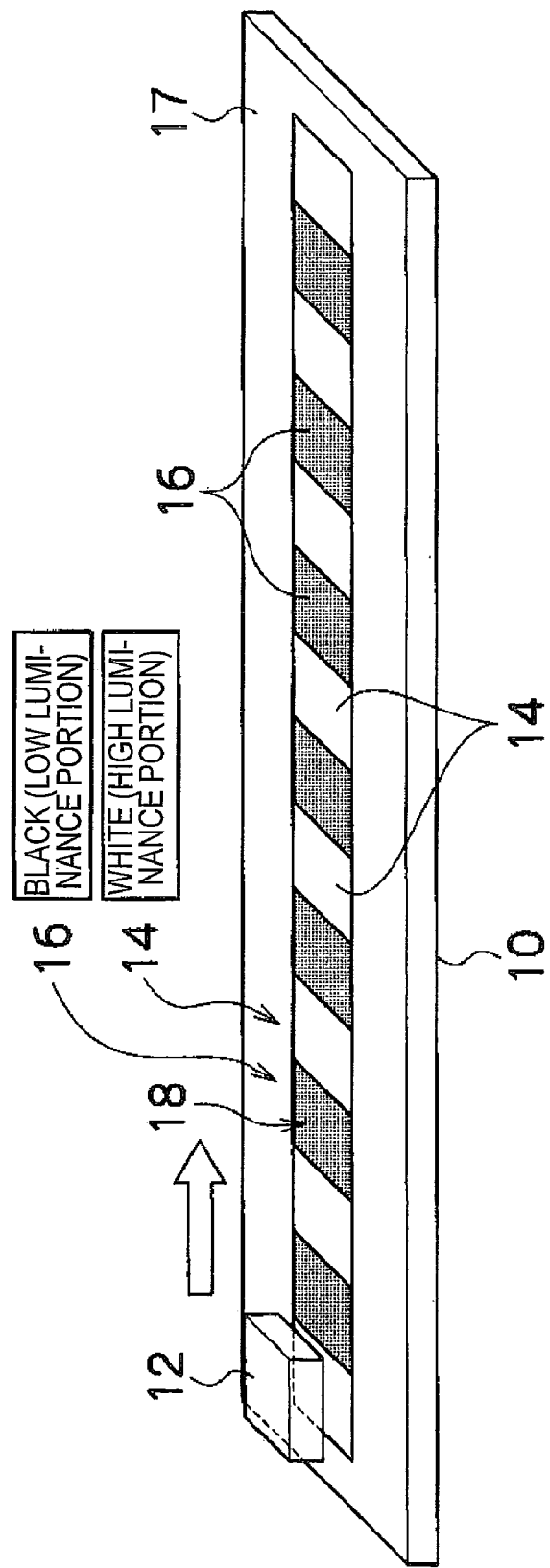
FIG. 1 is a perspective view depicting a configuration of a position detection sensor according to a first embodiment of the invention.

FIG. 1 is a perspective view depicting the configuration of a position detection sensor according to a first embodiment of the invention. As is shown in FIG. 1, the position detection sensor of this embodiment includes a self-emitting linear scale 10 and a sensor part (a relative movable part) 12 which is disposed in such a manner as to move relative to the linear scale 10. For example, the linear scale 10 is attached to a stationary part and the sensor part 12 is provided so as to move in conjunction with a moving object to be measured. In addition, an opposite configuration may be adopted.

The linear scale 10 includes a frame part 17 and a pattern part 18, and a pattern in which white high luminance portions 14 and black low luminance portions 16 are arranged alternately is formed on the pattern part 18. The white high luminance portions 14, 14, . . . are each formed by an array of finely worked light sources and are each made to self-emit white light.

Figure 2:
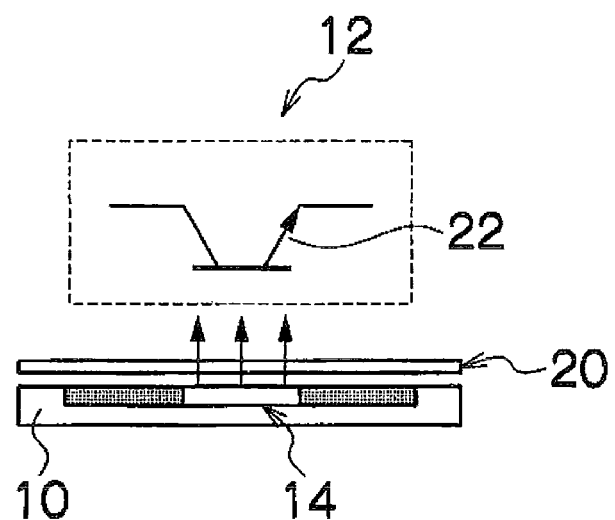
FIG. 2 shows a sectional view depicting the configuration of the position detection sensor of the first embodiment and a diagram depicting a detection circuit.

In addition, as is shown in a sectional view shown in FIG. 2, a vertical light guiding plate 20 is provided over an upper surface of the linear scale 10 for suppressing the dispersion of light emitted from the high luminance portions 14, 14, . . . so as to guide the light in a vertical direction relative to an upper surface of the pattern part 18.

On the other hand, as is shown in FIG. 2, the sensor part 12 has no such light projecting portion as the conventional one and includes only a light receiving portion, and the sensor part 12 has a light receiving device (a phototransistor) 22 in the light receiving portion.

Figure 3:
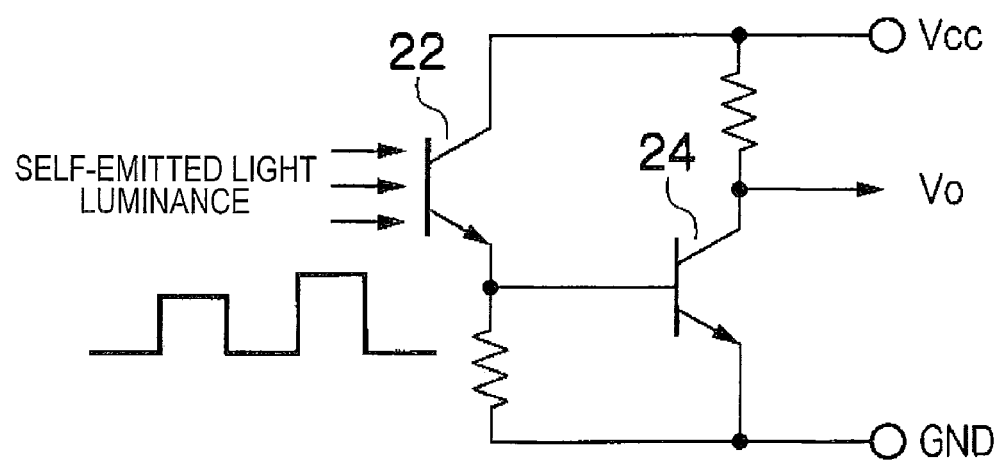
FIG. 3 is a diagram depicting the configuration of the detection circuit.

When the light receiving portion of the sensor part 12 moves to a position which is opposed to a high luminance portion 14 on the linear scale 10, a detection signal whose voltage corresponds to the quantity of light which has been incident on the light receiving portion (the phototransistor 22) of the sensor part 12 is made to be outputted by a detection circuit like one shown in FIG. 3. In FIG. 3, when no light is incident on the phototransistor 22, no current flows to the phototransistor 22, and a transistor 24 is in an off state. As this occurs, an output voltage Vo becomes a voltage Vcc applied from a power supply.

On the other hand, when light is incident on the phototransistor 22, a current whose magnitude corresponds to the quantity of light that has been incident on the phototransistor 22 is made to flow to the phototransistor 22. Then, a current which corresponds to the magnitude of the current is made to flow to the transistor 24. By this, the output voltage Vo becomes a voltage which results when only a voltage corresponding to the quantity of light which has been incident on the phototransistor 22 is subtracted from Vcc.

In addition, in the following description, a detection signal that is outputted from the sensor part 12 is such that an output voltage Vo which is outputted from the detection circuit in the way described above is converted from a negative voltage to a positive voltage with Vcc acting as a reference voltage (0V). In this case, in such a state that no light is incident on the phototransistor 22, a detection signal of 0 V (a low level voltage) is outputted. On the other hand, when light is incident on the phototransistor 22, a detection signal of a larger voltage (a high level voltage) is outputted as the quantity of light that is incident on the phototransistor 22 becomes larger.

Consequently, when the sensor part 12 moves, a pulse signal which is made up of a high level voltage and a low level voltage is outputted as a detection signal every time the sensor part 12 moves a distance equaling one pitch which is made up of a high luminance portion 14 and a low luminance portion 16 on the linear scale 10. By counting the number of pulses of the pulse signal, the moving or traveling amount of the sensor part 12 can be detected. In addition, by counting the number of pulses per unit time, the moving or traveling speed of the sensor part 12 can be detected.

Figure 4A:
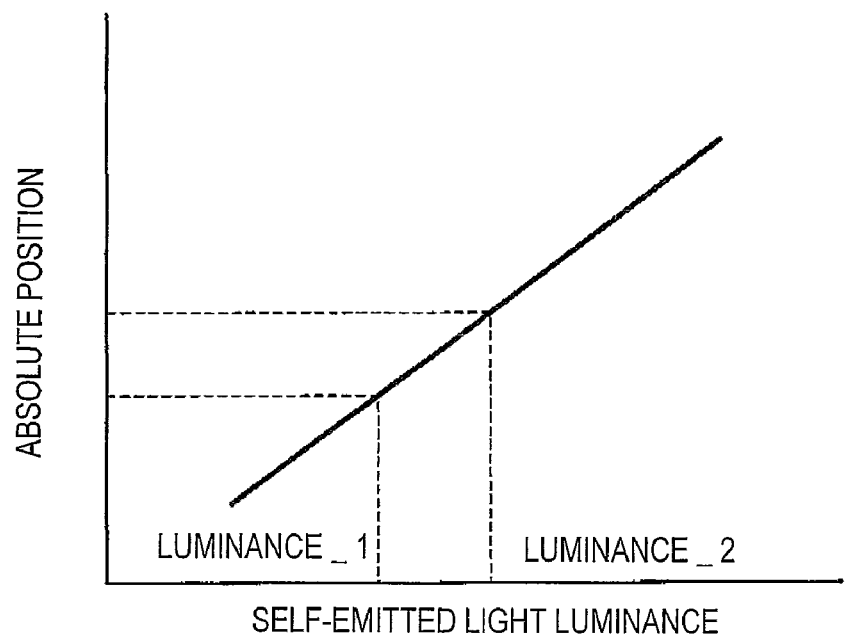
FIGS. 4A and 4B show explanatory diagrams which are used to describe luminances of light emitted from high luminance portions on a pattern on a linear scale.

In addition, the luminance of light emitted from the high luminance portions 14, 14, . . . on the linear scale 10 is not constant but is, as is shown in FIG. 4A, adjusted in such a manner that the luminance of self-emitted light from the respective high luminance portions 14 which are disposed in respective positions shown along an axis of abscissa is made to increase gradually as a distance from an origin becomes longer, relative to absolute positions of the linear scale 10 shown along an axis of ordinates.

Figure 4B:
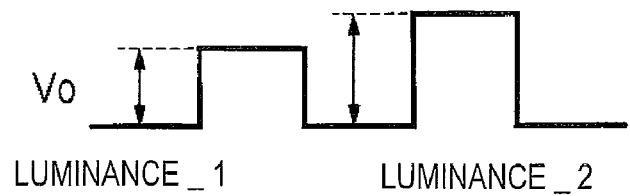

Consequently, when the sensor part 12 moves as is shown in FIG. 4B, a pulse signal which is made up of a high level voltage and a low level voltage is outputted by the sensor part 12 as detection signal, and a voltage value resulting when the detection signal is at the high level becomes a voltage value which corresponds to the absolute position of the sensor part 12. By detecting the voltage value which results when the detection signal is at the high level, the absolute position of the sensor part 12 can be detected.

In addition, in FIG. 4A, while the luminance of self-emitted light from the respective high luminance portions 14 is described as being adjusted in such a manner as to become higher as the distance from the origin becomes longer, the luminance of light emitted from the high luminance portions 14 may only have to differ according to the respective positions of the high luminance portions 14, and hence, the luminance of light emitted from the high luminance portions 14 may be adjusted so as to become smaller as the distance from the origin becomes longer. In addition, when the detection of an absolute position is unnecessary, the luminance of all the high luminance portions 14 may be made constant.

As has been described heretofore, by the use of the self-emitting linear scale 10, since reflected light is not detected but self-emitted light from the linear scale 10 is detected directly, it becomes possible to obtain a stable and high-output detection signal.

In addition, by the installation of the vertical light guiding plate 20 over the surface of the linear scale 10, the dispersion of light is suppressed, thereby making it possible to obtain a stabler and higher-output detection signal.

Additionally, the frame part of the linear scale 10 may be made as a constituent member which is integral with the high luminance portions 14 or the low luminance portions 16 of the pattern part 18.

In addition, a paper display such as an organic electroluminescence display can be used as the pattern part 18 of the linear scale 10, and by controlling the display of an image on the paper display, for example, the high luminance portions 14 may be made to be illuminated white (or other color) while the low luminance portions 16 may be made to be illuminated black so as to generate a pattern on the pattern part 18. The frame part 17 may be integrated with the pattern part 18, so that the whole of the linear scale 10 may be made up of the paper display. In this way, by the use of the paper display, in contrast to the conventional printed reflective scale, a resolution can be obtained which matches the number of lines which indicates the resolution of the paper display.

Next, a position detection sensor according to a second embodiment of the invention will be described.

A position detection sensor according to a second embodiment is configured the same as the position detection sensor of the first embodiment shown in FIGS. 1 to 3. On the other hand, high luminance portions 14 on a linear scale 10 emit light whose luminance is constant and flash at a predetermined frequency. In addition, as is shown in FIG. 5A, the high luminance portions 14 are made to flash in such a manner that the frequencies of flashings of the high luminance portions 14 which are disposed in respective positions shown along an axis of abscissa increase gradually as a distance from an origin becomes longer, relative to absolute positions of the linear scale 10 which are shown along an axis of ordinates.

Figure 5A:
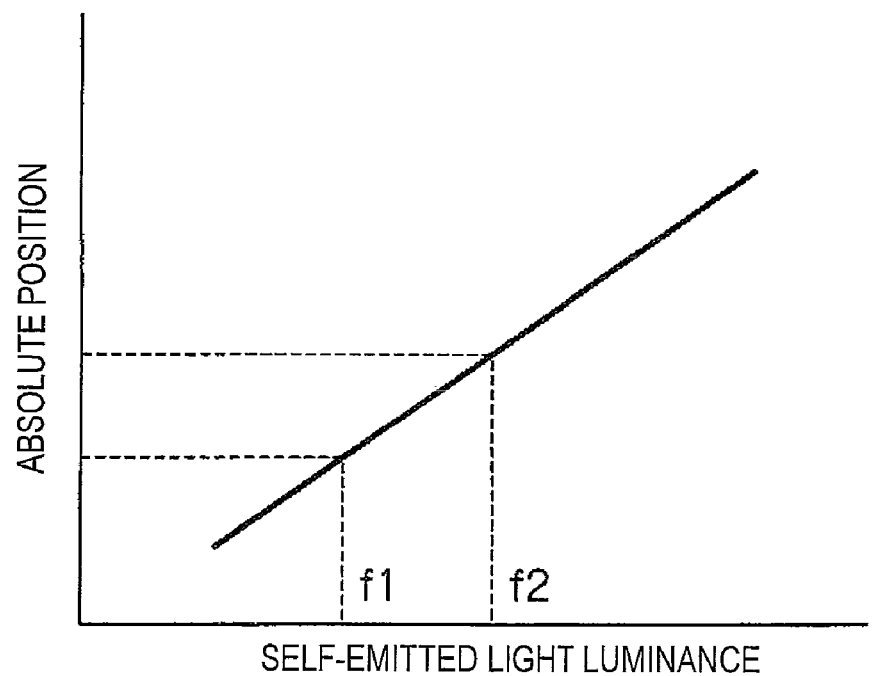
FIGS. 5A and 5B show explanatory diagrams which are used to describe frequencies of flashings of high luminance portions on a pattern on a linear scale in a second embodiment according to the invention.
Figure 5B:
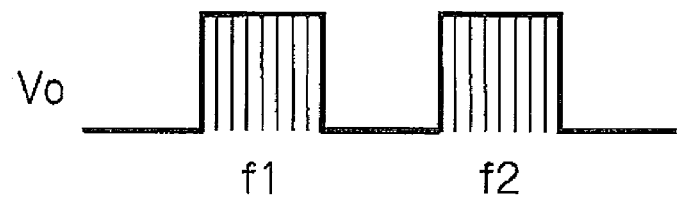

Consequently, when a sensor part 12 moves as is shown in FIG. 5B, a detection signal made up of a pulse signal with a predetermined frequency and a low level signal which continues a relatively long period of time is outputted from the sensor part 12, and a frequency at which the pulse signal with the predetermined frequency is being outputted becomes a frequency corresponding to the absolute position of the sensor part 12. By detecting the frequency at which the pulse signal of the detection signal is being outputted, the absolute position of the sensor part 12 can be detected.

In addition, in FIG. 5A, while the respective frequencies of flashings of the high luminance portions 14 are described as being adjusted in such a manner as to become higher as the distance from the origin becomes longer, the frequencies of flashings of the high luminance portions 14 may only have to differ in accordance with the respective positions of the high luminance portions 14, and hence, the frequencies of flashings of the high luminance portions may be made to become lower as the distance from the origin becomes longer. In addition, when the detection of an absolute position is unnecessary, all the frequencies of flashings of the high luminance portions 14 may be made constant.

Next, a position detection sensor according to a third embodiment of the invention will be described.

Figure 6:
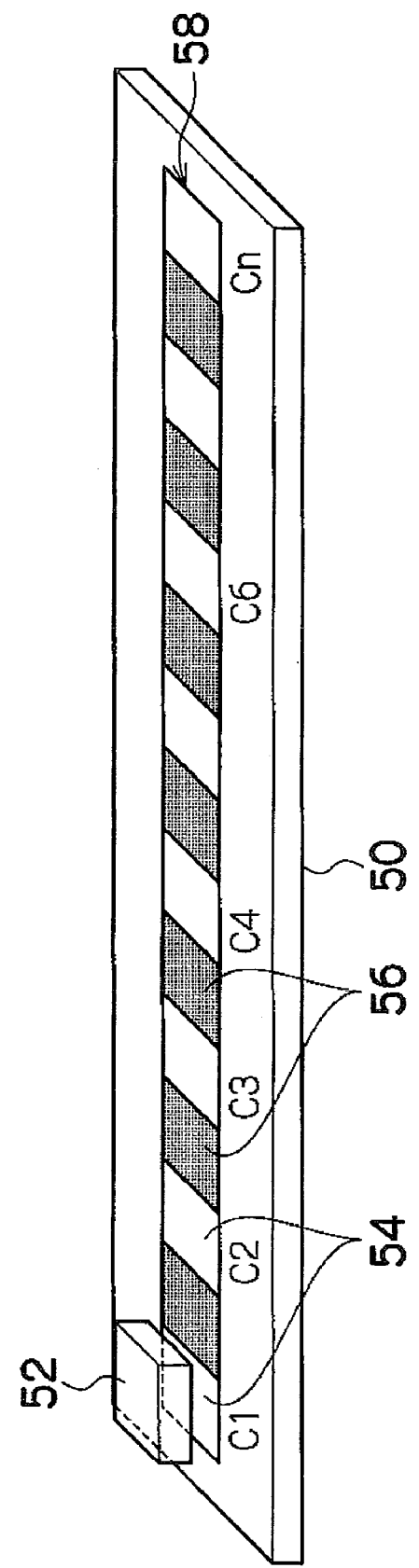
FIG. 6 is a perspective view depicting a configuration of a position detection sensor according to a third embodiment of the invention.

A position detection sensor of a third embodiment has, as is shown in FIG. 6, a linear scale 50 and a sensor part 52, and as with the first and second embodiments, the linear scale 50 includes a frame part 57 and a pattern part 58. As a pattern of this pattern part 58, being different from the patterns of the first and second embodiments which are formed by the difference in luminance between the luminance portions, a pattern is generated by a difference in color temperature. Namely, high color temperature portions 54 (C1 to Cn) whose color temperatures are high and low color temperature portions 56 in, for example, black whose color temperatures are low are disposed alternately on the pattern part 58. The high color temperature portions 54 are formed in such a manner as to be indicated by colors by arrays of finely worked light sources of red (R), green (G) and blue (B).

Figure 7:
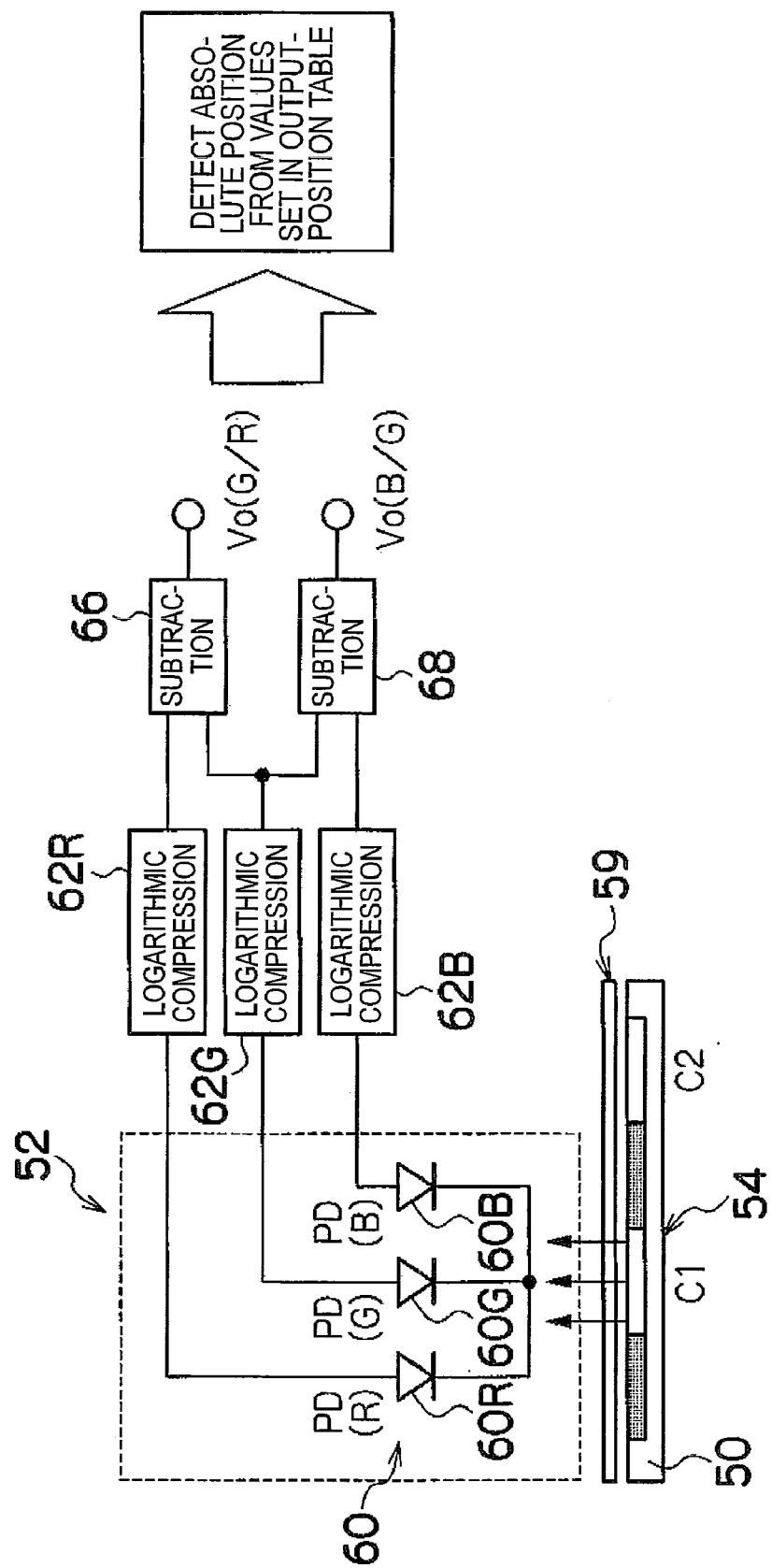
FIG. 7 shows a sectional view depicting the configuration of the position detection sensor of the third embodiment and a diagram depicting a detection circuit.

In addition, as is shown in a sectional view in FIG. 7, a vertical light guiding plate 59 is provided over an upper surface of the linear scale 50 for suppressing the dispersion of light emitted from high luminance portions 14, 14, ... so as to guide the light in a vertical direction relative to an upper surface of the pattern part 58.

On the other hand, the sensor part 52 includes a color sensor 60 shown in FIG. 7, and the color sensor 60 includes photodiodes 60R, 60G, 60B which receive light of respective wavelengths of red (R), green (G) and blue (B), respectively. Color temperatures are detected by a detection circuit as is shown in FIG. 7 relative to light incident on those photodiodes 60R, 60G, 60B.

Namely, outputs corresponding to quantities of light received by the respective photodiodes 60R, 60G, 60B are logarithmically compressed by a logarithmic compression circuit 62R, a logarithmic compression circuit 62G and a logarithmic compression circuit 62B, respectively. Then, outputs from the logarithmic compression circuit 60G and the logarithmic compression circuit 62R are subtracted by a subtraction circuit 66, and outputs from the logarithmic compression circuit 62B and the logarithmic compression circuit 62G are subtracted by a subtraction circuit 68. By this, a voltage (Vo(G/R)) corresponding to a ratio of a quantity of green light to a quantity of red light which have been received by the color sensor 60 and a voltage (Vo(B/G)) corresponding to a ratio of a quantity of blue light and a quantity of green light which have been received by the color sensor are outputted from the logarithmic compression circuit 62B and the logarithmic compression circuit 62G. Color temperatures of the light which has been incident on the color sensor 60 are detected by those voltages Vo(G/R), Vo(B/G).

In addition, the color temperatures of the high color temperature portions 54 are not constant, and the high color temperature portions 54 are made to be luminous in such a manner that the color temperatures of the high color temperature portions 54 which are disposed in the respective positions become higher gradually as a distance from an origin becomes longer relative to the absolute positions on the linear scale 50.

Consequently, when the sensor part 52 moves, pulse signals each made up of a high level voltage and a low level voltage are outputted from the subtraction circuits 66, 68 by the detection circuit, and a traveling amount and traveling speed of the sensor part 52 are detected from those detection signals in a similar way to those of the previous embodiments.

In addition, by referring to a table showing a relationship between outputs from the detection circuit and absolute positions when outputs from the detection circuit show high color temperatures, an absolute position of the sensor part 52 can be detected from data of color temperatures.

Next, a position detection sensor according to a fourth embodiment of the invention will be described.

Figure 8:
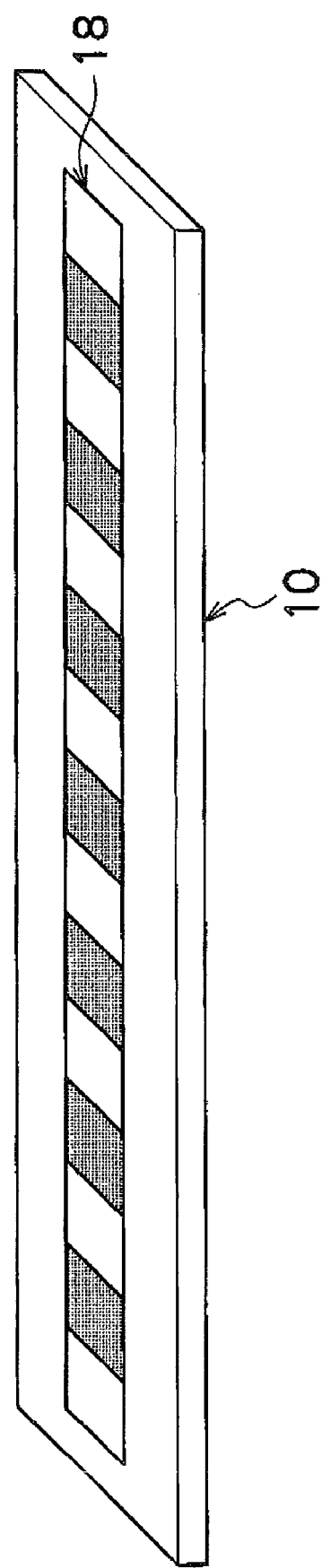
FIG. 8 is a perspective view of a linear scale in a position detection sensor according to a fourth embodiment of the invention.
Figure 9:
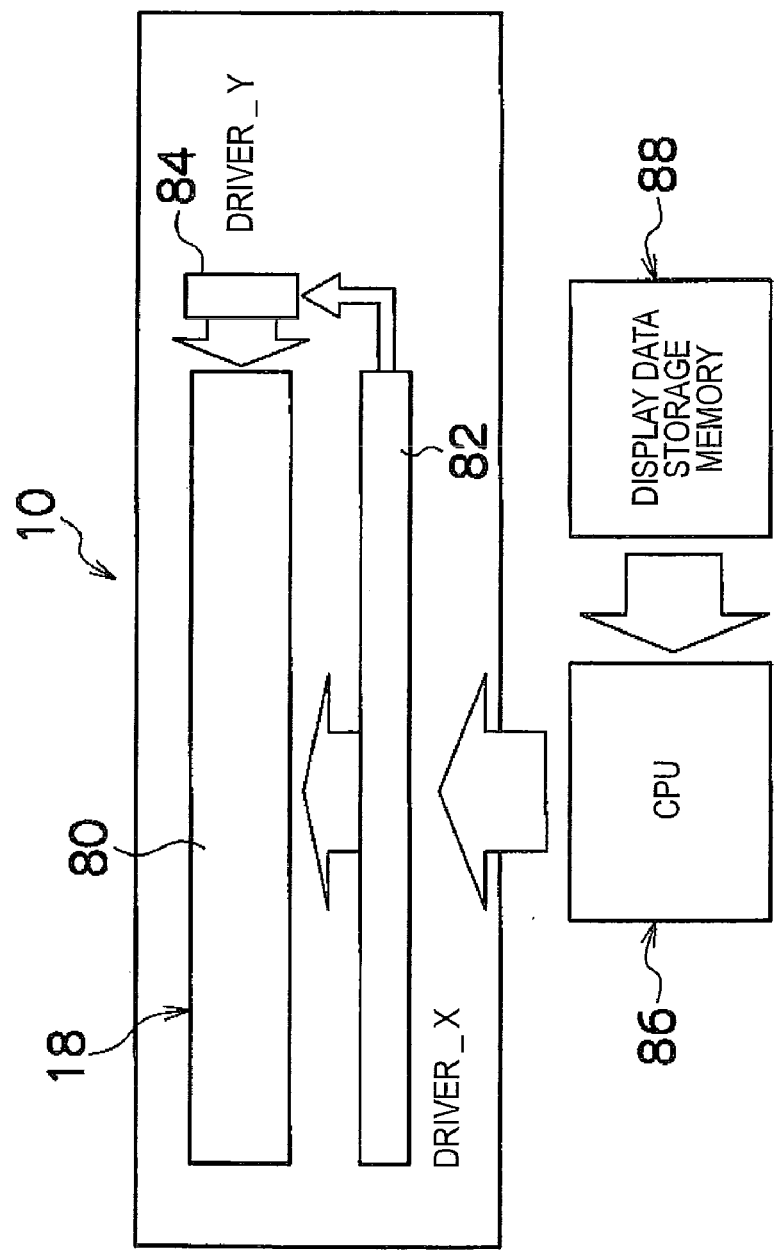
FIG. 9 is a block diagram of a control circuit when a paper display is used in a pattern part of the linear scale shown in FIG. 8.

This embodiment illustrates a form in which the pattern of the linear scale 10 (50) of the pattern part 18 (58) of the first to third embodiments is made to be able to be rewritten arbitrarily. As is shown in FIGS. 8, 9, the pattern part 18 of the linear scale 10 is made into a self-emitting paper display 80 such as an organic electroluminescence display, and the position detection sensor includes as a control circuit for controlling the paper display 80 drivers 82, 84 for implementing the display of the paper display 80 through matrix drive, a CPU 86 for generating and outputting a signal which causes a predetermined pattern (an image) to be displayed on the paper display 80 and a display data storage memory 88 which stores the pattern that is to be displayed on the paper display 80. Referring to the display data stored in the display data storage memory 88, the CPU 86 outputs to the drivers 82, 84 a signal which causes a pattern that the display data designates to be displayed on the paper display 80.

According to this configuration, by making the display data storage memory 88 into a writable memory so that the display data stored in the display data storage memory 88 can be rewritten into display data which designates a desired scale pattern, an arbitrary scale pattern can be displayed on the paper display 80. Consequently, it becomes possible to change the width of one pitch of the pattern part 18 or adjust the luminance or color temperature of light emitted. In the first to third embodiments, a ratio of the width of the high luminance portion 14 to the width of the low luminance portion 16 or a ratio of the width of the high color temperature portion 54 to the width of the low color temperature portion 56 can be changed. However, the ratios of the widths can be changed by changing the luminescence range even when only the high luminance portions 14 and the high color temperature portions 54 which are formed by arrays of light sources are used without using the paper display 80.

Next, a position detection sensor according to a fifth embodiment of the invention will be described.

Figure 10:
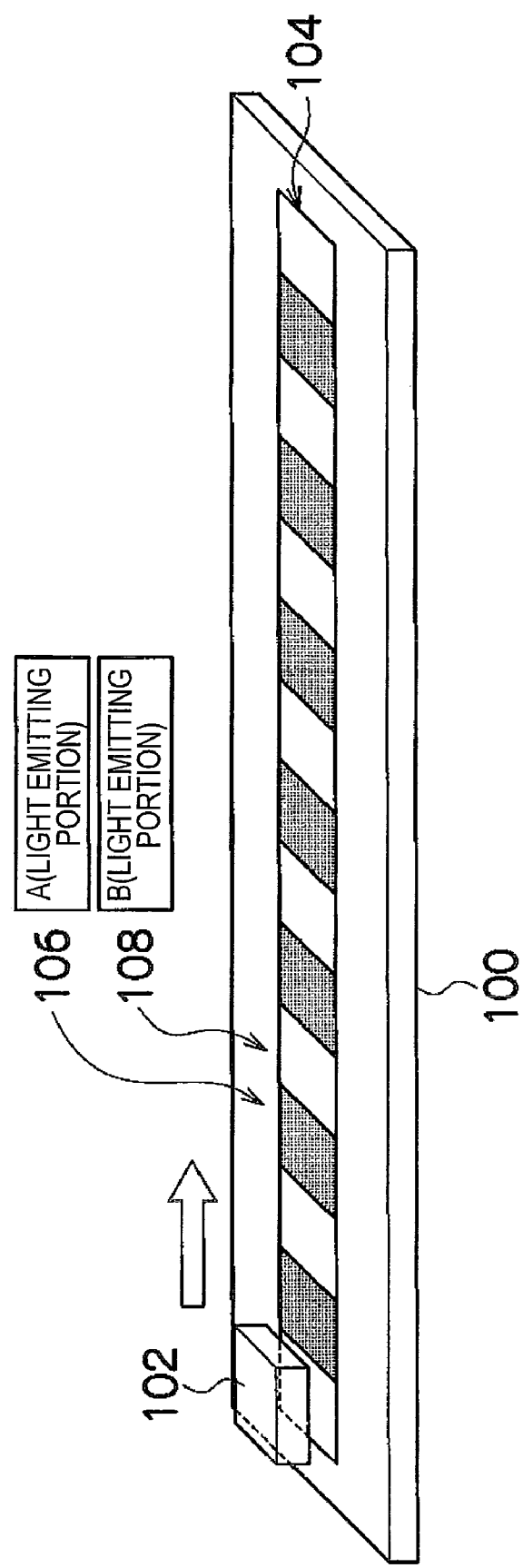
FIG. 10 is a perspective view depicting a configuration of a position detection sensor according to a fifth embodiment of the invention.

As is shown in FIG. 10, a position detection sensor of a fifth embodiment has a linear scale 100 and a reflection plate 102 which moves relative to the linear scale 100. In addition, as with the embodiments that have been described before, the reflection plate 102 is attached to, for example, a movable object to be measured in such a manner as to move while linking therewith similar to the sensor part 12, so as to measure the position and speed of the reflection plate 102 relative to the linear scale 100.

As with the first to fourth embodiments, the linear scale 100 has a pattern part 104, and light emitting portions 106 and light receiving portions 108 are arranged alternately on the pattern part 104. As with the embodiments that have been described before, the light emitting portions 106 are formed by arrays of finely worked light sources, and the light receiving portions 108 are formed by light receiving devices.

Figure 11:
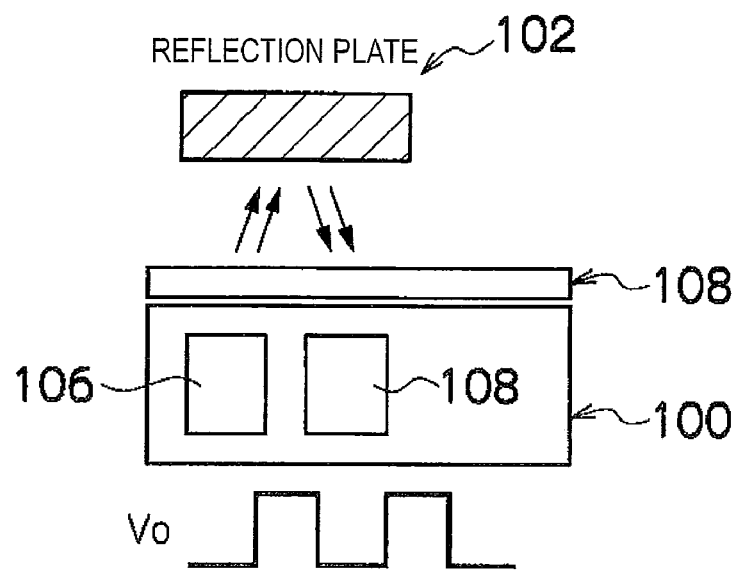
FIG. 11 is a sectional view depicting the configuration of the position sensor of the fifth embodiment.

In addition, as is shown in a sectional view in FIG. 11, a light guiding plate 108 is provided over an upper surface of the pattern part 104 for suppressing the dispersion of light emitted from the light emitting portions 106.

On the other hand, the reflection plate 102 has only a reflection surface which reflects light emitted from a light emitting portion 106 and does not include the light emitting portions that the sensor part 12 does in the previous embodiments.

According to this configuration, light emitted from a light emitting portion 106 which lies in a position which is opposed to the reflection plate 102 in the pattern part 104 of the linear scale 100 is reflected by the reflection plate 102 and the light so reflected is incident on a light receiving portion 108 which lies adjacent to the light emitting portion 106 which emitted the light.

Consequently, in the event that respective outputs of the plurality of light receiving portions 108 are made to be read individually, an absolute position of the reflection plate 102 can be detected from the position of the light receiving portion on which the reflected light from the reflection plate is incident. In addition, based on this configuration, a traveling amount, traveling direction and absolute position of the reflection plate 102 can be detected.

In addition, even in a case where the respective outputs of the plurality of light receiving portions 108 are not made to be read individually but a total sum of the outputs of all the light receiving portions is made to be read, a traveling amount, traveling direction and absolute position of the reflection plate 102 can be detected by a method similar to any of the first to third embodiments.

Namely, as with the high luminance portions 14 in the first or second embodiment, luminances of light emitted from the light emitting portions 106 or frequencies of flashings thereof may only have to be made to increase (decrease) gradually as a distance from an origin becomes longer relative to absolute positions on the linear scale 100, so that the quantities of light received by the light receiving portions 108 or frequencies flashings are changed by the positions of the reflection plate 102.

In addition, as with the high color temperature portions 54 in the third embodiment, the light emitting portions 106 are formed in such a manner as to be displayed in colors by arrays of finely worked red, green and blue light sources, so that the light emitting portions 106 are made to emit light at high color temperatures. In addition, the light emitting portions 106 may be made to emit light in such a manner that the color temperatures of the light emitting portions 106 which lies in the respective positions increase gradually as a distance from an origin becomes longer relative to the absolute positions on the linear scale 100. As this occurs, as with the sensor part 52 of the third embodiment, the light receiving portions 108 are made into color sensors, and the color temperature of light that is received by the light receiving portions may only have to be made to be changed by the position of the reflection plate 102.

Figure 12:
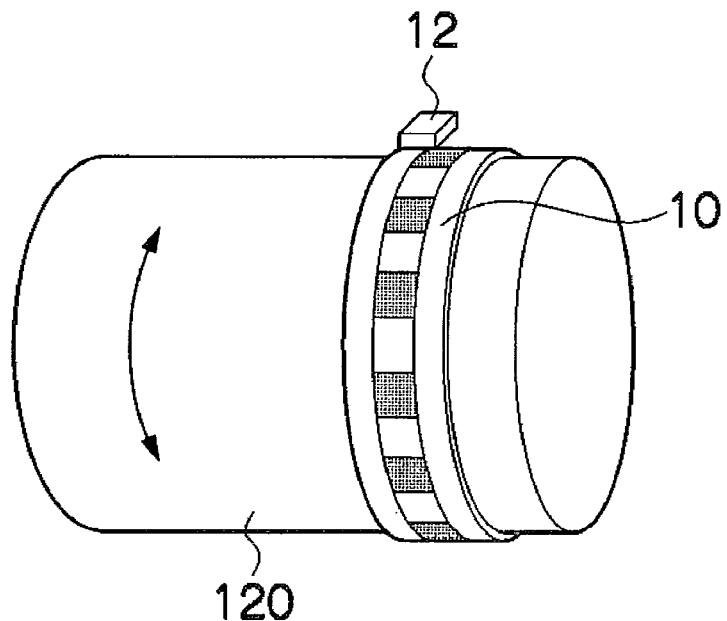
FIG. 12 is a diagram depicting a form in which a linear scale of a position detection sensor according to an embodiment of the invention is installed on a curved surface.
Figures 13A, 13B, 13C:
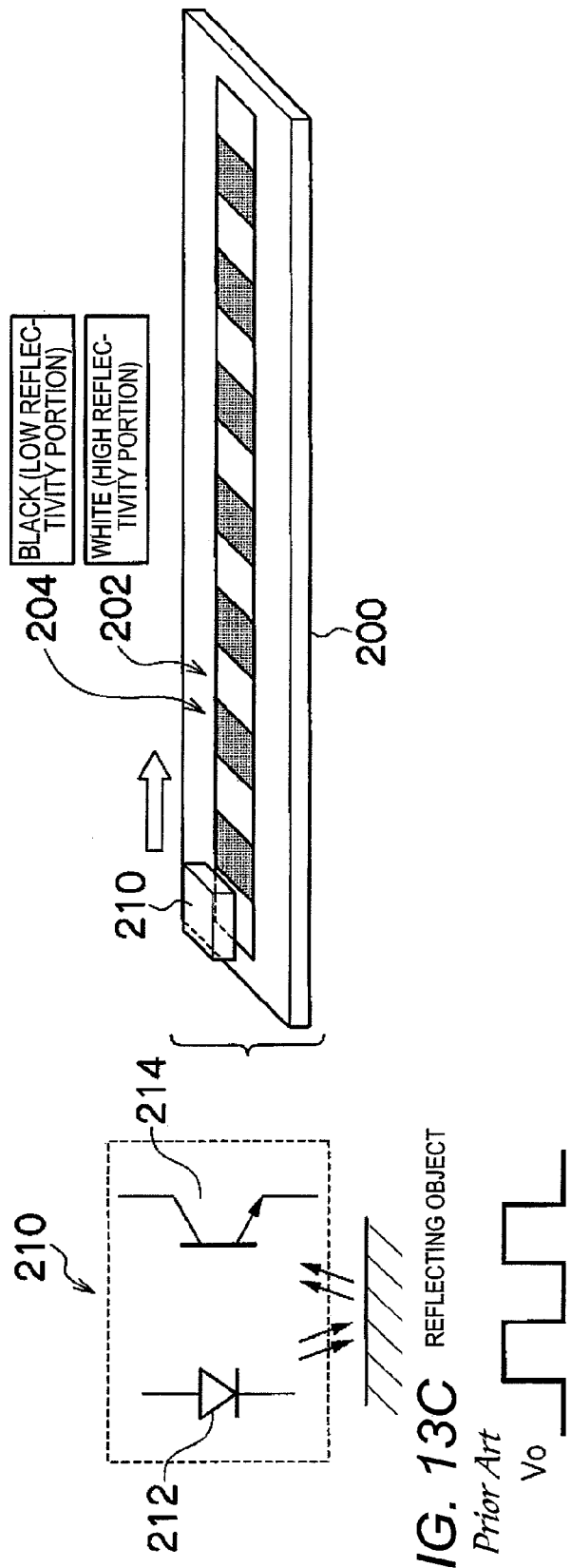
FIGS. 13A to 13C show diagrams depicting a configuration of a reflective type position detection sensor which employs a linear scale.

Thus, the linear scales 10, 50, 100 of the position detection sensors of the respective embodiments can also be provided on a curved surface. To illustrate this by the use of the position detection sensor of the first embodiment, the linear scale 10 is installed on, for example, a curved surface of a rotating cylindrical rotary member 120 as is shown in FIG. 12, and the sensor part 12 is installed on a stationary part, which is not shown. By this configuration, a rotating amount, rotating speed and absolute position of the rotary member 120 or a moving amount, moving speed and absolute position of a moving body which moves while linking with the rotary member 120 can be detected. As an example of the rotary member 120, an operation ring or a rotary barrel is raised for driving a moving body which is made up of a focusing lens, zooming lens or iris of a photographic lens.

What is claimed is:
1. A position detection sensor comprising:
   a scale including a self-emitting part that emits light to form a pattern on the scale; and
   a relative movable part provided in such a manner to be opposed to the scale and to be movable relative to the scale, the relative movable part including a light receiving part that detects the light emitted at a position in a portion of the scale where the pattern is formed, the position corresponding to a current position of an object to be measured, wherein at least one of a traveling amount, traveling speed and absolute position of the object is detected based on a detection signal outputted from the light receiving part.

2. The position detection sensor according to claim 1, wherein a self-emitting paper display is provided in the portion of the scale where the pattern is formed, and the pattern is formed by an image display on the self-emitting paper display.

3. The position detection sensor according to claim 1, further comprising a vertical light guiding plate provided over a surface of the portion of the scale where the pattern is formed.

4. The position detection sensor according to claim 1, wherein the patter of the scale is a pattern in which high luminance portions and low luminance portions are arranged alternately, the light receiving part receives the light to detect a luminance of the received light, and the at least one of a traveling amount, traveling speed and absolute position of the object is detected based on the luminance of the received light.

5. The position detection sensor according to claim 4, wherein the high luminance portions have respective luminances that differ according to positions of the high luminance portions, and the absolute position of the object is detected based on a magnitude of the luminance detected by the light receiving part.

6. The position detection sensor according to claim 4, wherein the high luminance portions flash at frequencies that differ according to positions of the high luminance portions, and the absolute position of the object is detected based on a signal frequency of the luminance detected by the light receiving part.

7. The position detection sensor according to claim 4, wherein a wide ratio of the high luminance portions to the low luminance portions is made to be able to be changed.

8. The position detection sensor according to claim 1, wherein the pattern of the scale is a pattern in which high color temperature portions and low color temperature portions are arranged alternately, the light receiving part receive the light to detect a color temperature of the received light, and the at least one of a traveling amount, traveling speed and absolute position of the object is detected based on the color temperature of the received light.

9. The position detection sensor according to claim 8, wherein a width ratio of the high color temperature portions to the low color temperature portions is made to able to be changed.

10. The position detection sensor according to claim 1, further comprising a memory that stores the pattern of the scale.

11. The position detection sensor according to claim 10, wherein the pattern stored in the memory is writable.

12. A position detection sensor comprising:

a scale including self-emitting portions and light receiving portions arranged alternately to form a pattern on the scale; and a relative movable part provided in such a manner to be opposed to the scale and to be movable relative to the scale, the relative movable part including a reflecting surface that reflects light emitted from a light emitting portion of the light emitting portions which corresponds to a current position of an object to be measured, so that the reflected light is incident on a light receiving portion adjacent to the light emitting portion, wherein at least one of a traveling amount, traveling speed and absolute position of the object is detected based on a detection signal outputted from the light receiving portion.

\* \* \* \* \*